June 16, 1936.	N. L. WALKER	2,044,652
SAND SPREADING APPARATUS
Filed March 27, 1935	2 Sheets-Sheet 1

Inventor,
Norman L. Walker,
by Walter P. Geiger
Attorney.

June 16, 1936.  N. L. WALKER  2,044,652
SAND SPREADING APPARATUS
Filed March 27, 1935  2 Sheets-Sheet 2
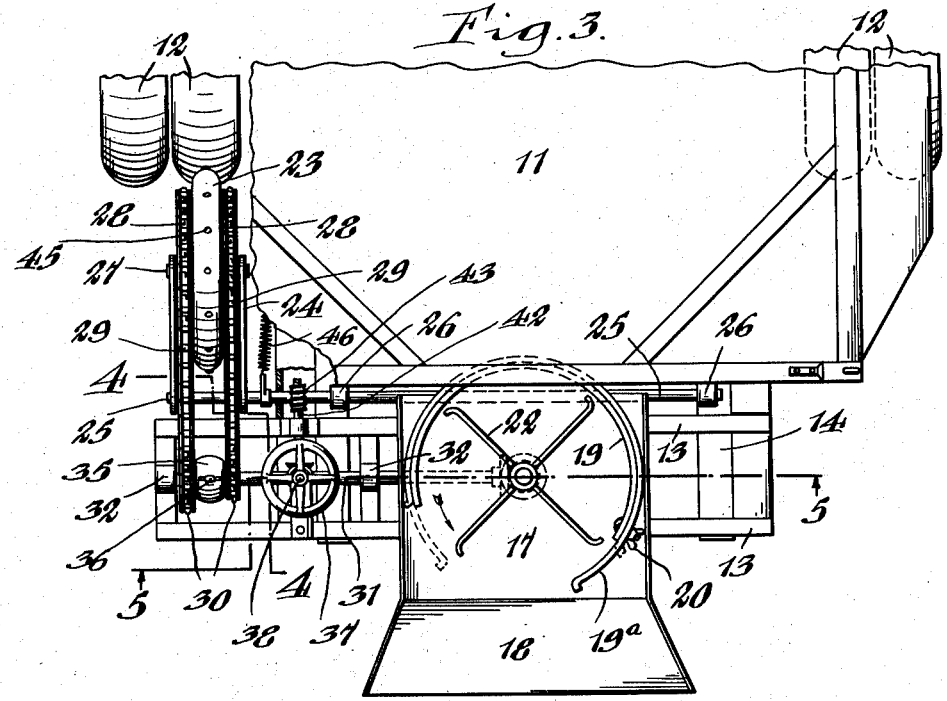
Inventor,
Norman L. Walker,
by Walter P. Guyer
Attorney.

Patented June 16, 1936

2,044,652

UNITED STATES PATENT OFFICE 2,044,652

SAND SPREADING APPARATUS

Norman L. Walker, Lewiston, N. Y.

Application March 27, 1935, Serial No. 13,293

8 Claims. (Cl. 275—8)

This invention relates to an apparatus designed more particularly for spreading sand, gravel, cinders or like material on icy or slippery roadways.

One of the objects of this invention is the provision of an efficient apparatus of this character which has been designed more particularly for attachment to vehicle-trucks whereby the material contained in the truck body is fed into a hopper borne by the apparatus and then distributed over the roadway while the vehicle is in motion.

Another object is the provision of a sand-spreading apparatus of this character which is operatively connected to the driving wheels of the vehicle to which it is applied for actuating the distributor unit of the apparatus.

A further object of the invention is the provision of a spreading apparatus which is simple, compact and inexpensive in construction, and which is so designed and constructed as to be readily applied to and removed from the vehicle so that when not in use it may be stored away as a unit.

Other features of the invention reside in the construction and arrangement of parts hereinafter described and particularly pointed out in the appended claims.

In the accompanying drawings:—

Figure 1:
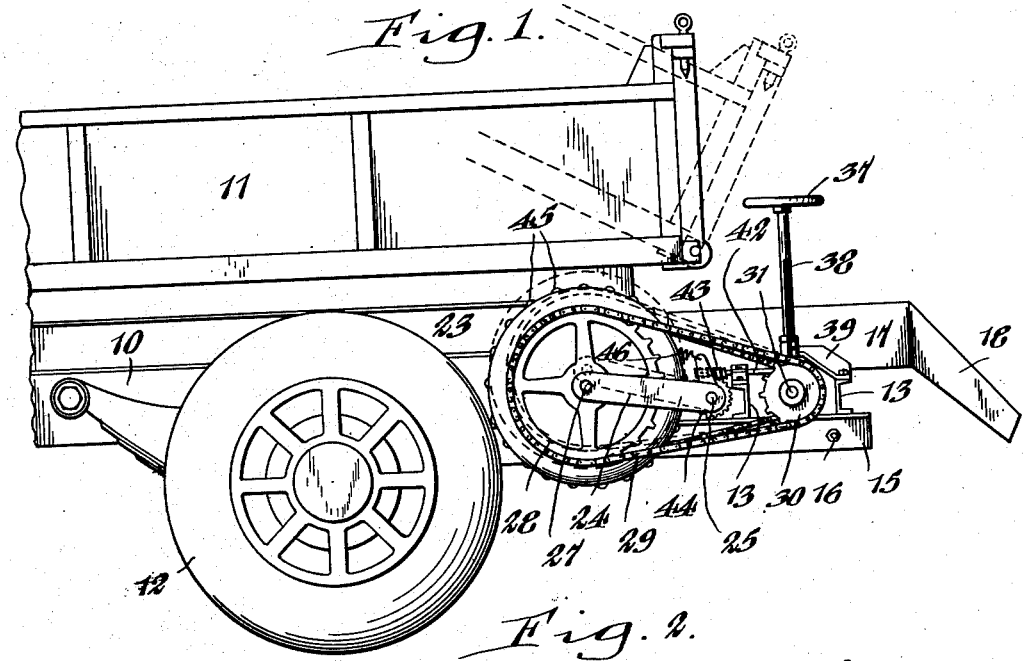
Figure 2:
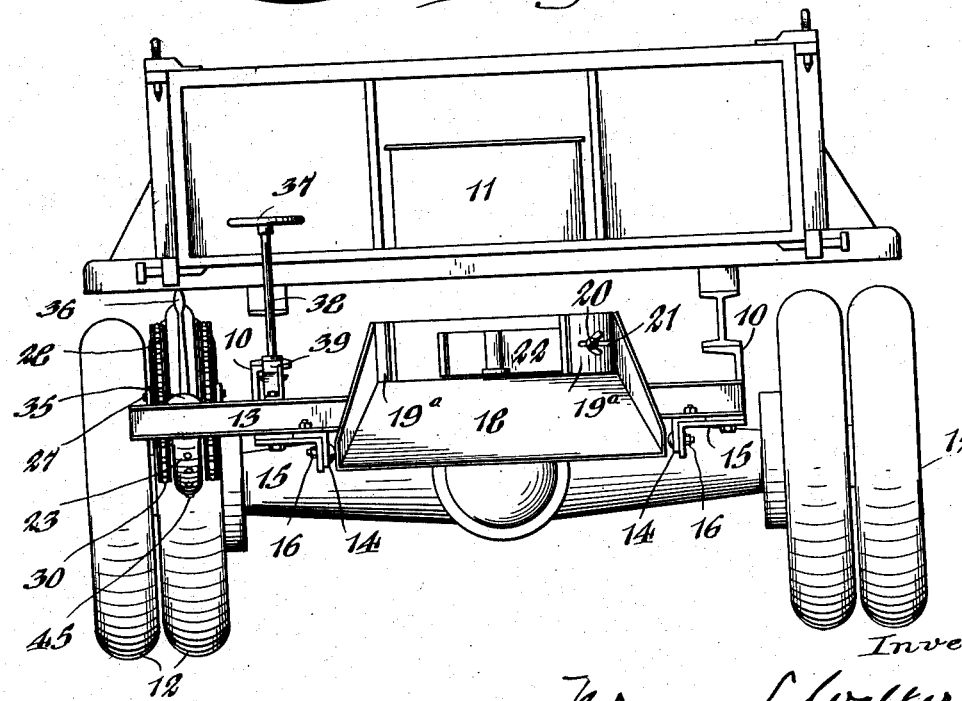

Figure 1 is a fragmentary side elevation of a vehicle truck showing my improved spreading apparatus applied thereto. Figure 2 is a rear view of the same. Figure 3 is a top plan view thereof. Figure 4 is an enlarged, fragmentary, longitudinal section taken substantially in the plane of line 4—4, Figure 3. Figure 5 is an enlarged cross section taken on line 5—5, Figure 3.

Similar characters of reference indicate corresponding parts throughout the several views.

By way of example, my improved apparatus for spreading sand or like materials on slippery highways has been shown in connection with a motor vehicle wherein 10, 10 indicates the longitudinal frame or chassis rails, 11 the truck-body which is of the tiltable type, and 12, 12 the rear drive wheels of the vehicle.

The spreading apparatus is preferably designed as a unit for ready attachment to and removal from the chassis frame of the truck and to this end it comprises generally a supporting frame, a hopper or receiver to which the material in the truck-body is adapted to be delivered during the travel of the vehicle over the highway, a discharge chute leading from the hopper for effecting the distribution of the material uniformly over the highway, a revolving feed wheel disposed within the hopper for directing the material to the discharge chute, and a releasable driving connection for transmitting motion to the feed wheel from one of the drive wheels of the truck.

The frame which supports the working parts of the spreading apparatus, is preferably horizontally disposed and removably mounted at the rear end of the chassis-frame and consists of parallel members 13 extending crosswise of the vehicle and laterally spaced longitudinal members or angle bars 14 which extend lengthwise of the vehicle and which are slidably mounted upon guide or supporting rails 15 secured to the chassis-rails 10, 10, as shown in Figures 2 and 5. This frame 13, 14 may be readily applied to and removed from the guide rails 15, and when in operative position on the truck, bolts 16 may be employed for securely anchoring the spreading unit frame thereto. Mounted on this spreader unit frame substantially centrally thereof to receive the material in the truck-body when the same is tilted to the position shown by dotted lines in Figure 1, is a hopper or receiver 17 open on its top side and having a radial opening at its rear side communicating with a discharge chute 18 from which the material flows by gravity in a comparatively thin stream onto the roadway as the vehicle travels thereover. This hopper, by preference, includes a fixed, substantially circular wall 19 and a companion circumferentially adjustable wall 19ª. The adjustable wall may be held in a fixed position of adjustment, to provide a predetermined radial positioning of the discharge mouth to accordingly direct the flow of the material from the hopper into the discharge chute, by a clamping bolt and slot connection 20, 21.

Revolvably mounted within the hopper 17 and within the circumference defined by the walls 19, 19ª is a paddle or feed wheel 22 which functions to agitate the material in the hopper and direct it outwardly through its discharge mouth into the chute 18. Motion is transmitted to this feed wheel from one of the drive wheels 12 of the vehicle by the following mechanism:

The numeral 23 indicates a friction drive wheel adapted for peripheral engagement with one of the rear wheels of the vehicle and journaled in a vertically-swinging yoke or frame 24 connected to a pivot shaft 25 journaled in suitable bearings 26 on the frame 13, 14. The axle 27 of the friction wheel 23 has sprocket wheels 28 thereon which are connected by sprocket chains 29 with companion, different-sized sprocket wheels 30 mounted on a driven shaft 31 extending crosswise of the vehicle and journaled in suitable bearings 32 in the supporting frame 13, 14, as shown in Figure 3. At its inner end this shaft is provided with a bevel gear 33 meshing with a corresponding bevel gear 34 of the feed wheel 22. Associated with the sprocket wheel 30 is a suitable clutch unit indicated generally by the numeral 35 and including a clutch control lever 36 by which the speed of the paddle wheel 22 may be changed as desired to meet the condition of the roadway.

The drive wheel yoke 24 is shiftable vertically to bring its drive wheel into and out of frictional engagement with the vehicle wheel 12. For this purpose, there is provided a hand wheel 37 positioned adjacent the rear end of the truck-body for actuation by the attendant stationed therein and whose post 38 is journaled in a bearing bracket 39 and is provided at its lower end with a bevel gear 40 meshing with a like gear 41 secured to one end of a horizontal shaft 42. The opposite end of the latter has a worm 43 thereon meshing with a worm wheel 44 fixed on the pivot shaft 25. By turning the hand wheel 37 in one direction or the other, the friction wheel is brought into or out of engagement with the corresponding vehicle wheel 12, as seen by full and dotted lines in Figure 1, respectively. To prevent slippage between the friction drive wheel 23 and the vehicle wheel 12, a knob-like tread 45 is applied to the drive wheel, which tread tends to throw off any snow or ice accumulated on the tread of the vehicle wheel. A spring 46 connected to the yoke-shaft 25 tends constantly to urge the yoke downwardly.

In the position of the parts shown in the drawings, the hopper walls 19, 19a are so positioned as to direct the discharge of the material from the hopper 17 into the discharge chute 18 with the feed wheel 22 traveling in the direction of the arrow indicated in Figure 3, corresponding to the forward motion of the vehicle, the discharge mouth of the hopper formed by the opposing edges of the circular walls 19, 19a being disposed for the most part at the left side of the hopper, when viewing Figure 3. Should it be desired to discharge the material onto the highway when the vehicle is travelling in a reverse direction, which would cause a reversal of rotation of the feed wheel 22, then the circular hopper wall 19a is adjusted to the dotted line position shown in Figure 3 which would position the discharge mouth for the most part at the right hand side of the hopper.

I claim as my invention:—

1. In combination with the chassis frame of a vehicle, of a sand spreading unit for distributing sand or like material on a roadway, comprising a supporting structure adapted for attachment to the chassis frame, a hopper mounted thereon having a radial opening and a discharge chute leading therefrom, said hopper including relatively adjustable walls to provide a predetermined radial position of the hopper-opening, a revolving feed member for directing the material from said hopper to the discharge chute, and means in driving engagement with one of the wheels of the vehicle for revolving said feed member.

2. In combination with the chassis frame of a vehicle having a guide track thereon, of a sand spreading unit for distributing sand or like material on a roadway, comprising a supporting structure slidably mounted on said guide track for detachment therefrom, a hopper mounted thereon and having a radial opening in its rear side and a discharge chute leading therefrom, said hopper including circumferentially adjustable side walls to predetermine the radial position of the hopper-opening, means for clamping the walls in a set position of adjustment, a revolving feed member for directing the material from said hopper to the discharge chute, and means disposed for driving engagement with one of the vehicle-wheels for revolving said feed member.

3. In combination with the chassis frame of a vehicle, of a sand spreading unit for distributing sand or like material on a roadway, comprising a supporting structure adapted for attachment to the chassis frame, a hopper mounted thereon having a radial opening at its rear side and a discharge chute leading therefrom, a substantially horizontal revolving feed member disposed in the hopper in the plane of its opening for directing the material centrifugally from said hopper to the discharge chute, a vertically-swinging yoke pivoted to said supporting structure and having a drive wheel thereon for releasable engagement with one of the vehicle-wheels, and means for transmitting motion from said drive wheel to said feed member.

4. In combination with the chassis frame of a vehicle, of a sand spreading unit for distributing sand or like material on a roadway, comprising a supporting structure adapted for attachment to the chassis frame, an upright hopper mounted thereon having a peripheral opening at its rear side and a discharge chute leading therefrom, a bladed, revolving feed member disposed axially of the hopper for directing the material centrifugally from said hopper to the discharge chute, a vertically-swinging yoke pivoted to said supporting structure and having a drive wheel thereon for releasable engagement with one of the vehicle-wheels, means for transmitting motion from said drive wheel to said feed member, and means for shifting said yoke to bring its drive wheel into and out of driving engagement with said vehicle-wheel.

5. In combination with the chassis frame of a vehicle, of a sand spreading unit for distributing sand or like material on a roadway, comprising a supporting structure adapted for attachment to the chassis frame, a hopper mounted thereon having a discharge chute leading therefrom, a revolving feed member for directing the material from said hopper to the discharge chute, means in said hopper forming an adjustable discharge mouth therefor, and means disposed for driving engagement with one of the vehicle-wheels for revolving said feed member.

6. In combination with the chassis frame of a vehicle, of a sand spreading unit for distributing sand or like material on a roadway, comprising a supporting structure adapted for attachment to the chassis frame, a hopper mounted thereon having a discharge chute leading therefrom, a revolving feed member for directing the material from said hopper to the discharge chute, means in said hopper forming an adjustable discharge mouth therefor, said means including relatively shiftable walls which in one position locate the discharge mouth to direct the material toward one side of the chute and in another position to direct the material toward the opposite side of said chute, and means disposed for driving engagement with one of the vehicle wheels for revolving said feed member.

7. An apparatus for spreading sand or like material on a slippery roadway, comprising a supporting frame adapted for attachment to a vehicle having a tiltable dump-body, a hopper fixed on said frame for receiving the material directly from the dump-body when tilted and having a discharge chute leading therefrom, a revolvable feed member arranged in said hopper for directing the material toward said chute, and transmission means mounted on said frame for driving said feed member and adapted for operative engagement with one of the vehicle wheels.

8. The combination with a wheeled vehicle having a chassis frame including a guide track adjacent its rear end and a tiltable truck-body, of a spreading unit for distributing sand or like material on a slippery roadway detachably mounted on said chassis frame in dump-receiving relation to the tiltable truck-body and comprising a supporting structure slidably mounted on said guide track, a substantially upright hopper mounted thereon and disposed below and rearwardly of the truck-body to receive the material therefrom in its dumping position, said hopper having a circumferential opening at its rear side and a discharge chute leading therefrom, a revolving feed member disposed axially of said hopper for directing the material centrifugally therefrom into the discharge chute, and means in driving engagement with one of the wheels of the vehicle for revolving said feed member.

NORMAN L. WALKER.